US007574396B2

(12) United States Patent
Kalotay et al.

(10) Patent No.: US 7,574,396 B2
(45) Date of Patent: Aug. 11, 2009

(54) METHOD OF AND APPARATUS FOR ADMINISTERING AN ASSET-BACKED SECURITY USING COUPLED LATTICE EFFICIENCY ANALYSIS

(75) Inventors: Andrew J. Kalotay, Spencertown, NY (US); Deane Yang, New York, NY (US)

(73) Assignee: Andrew Kalotay Associates, Inc., New York, NY (US)

( * ) Notice: Subject to any disclaimer, the term of this patent is extended or adjusted under 35 U.S.C. 154(b) by 1031 days.

(21) Appl. No.: 10/309,109

(22) Filed: Dec. 4, 2002

(65) Prior Publication Data

US 2003/0105696 A1 Jun. 5, 2003

Related U.S. Application Data

(60) Provisional application No. 60/334,961, filed on Dec. 4, 2001.

(51) Int. Cl.
*G06Q 40/00* (2006.01)

(52) U.S. Cl. ............................. 705/37; 705/38; 705/35; 705/36

(58) Field of Classification Search .................. 705/36, 705/37, 34, 35, 38
See application file for complete search history.

(56) References Cited

U.S. PATENT DOCUMENTS

| 5,563,783 | A | 10/1996 | Stolfo et al. | |
|---|---|---|---|---|
| 5,644,726 | A | 7/1997 | Oppenheimer | |
| 5,870,720 | A | 2/1999 | Chusid et al. | |
| 5,983,206 | A | 11/1999 | Oppenheimer | |
| 6,021,397 | A * | 2/2000 | Jones et al. | 705/36 R |
| 6,167,384 | A | 12/2000 | Graff | |
| 6,192,347 | B1 | 2/2001 | Graff | |
| 6,233,566 | B1 * | 5/2001 | Levine et al. | 705/36 R |
| 2001/0014875 | A1 | 8/2001 | Young et al. | |
| 2001/0029482 | A1 | 10/2001 | Tealdi et al. | |
| 2001/0042035 | A1 | 11/2001 | Kelly et al. | |
| 2001/0042785 | A1 * | 11/2001 | Walker et al. | 235/379 |
| 2001/0044772 | A1 | 11/2001 | Allen et al. | |
| 2002/0035530 | A1 * | 3/2002 | Ervolini et al. | 705/36 |
| 2004/0117302 | A1 * | 6/2004 | Weichert et al. | 705/40 |

OTHER PUBLICATIONS

Industry Faces Worst Aircraft Lease Rates In Decade Airline Financial News. Potomac: Dec 3.*
Davidson, A., et al,. *The Refinancing Threshold Pricing Model—An Economic Approach to Valuing MBS*, Journal of Real Estate Finance and Economics, Jun. 1988, pp. 1-19.
Boyce, W., et al., *Optimum Bond Calling and Refunding*, Interfaces, vol. 9, No. 5, Nov. 1979, pp. 36-49.
Howard, C., et al., *Embedded Call Options and Refunding Efficiency*, Advances in Futures and Options Research, vol. 3, 1988, pp. 97-117.
Kalotay, A., et al., *A Model for Valuing Bonds and Embedded Options*, Financial Analysts Journal, May/Jun. 1993, pp. 35-46.

(Continued)

*Primary Examiner*—Frantzy Poinvil
*Assistant Examiner*—Clement Graham
(74) *Attorney, Agent, or Firm*—Buchanan Ingersoll & Rooney PC (57) ABSTRACT

New tools for modeling prepayment of principal by obligors behind asset-backed securities are provided. The obligors are categorized into groups for ordered removal from the modeling and valuation process according to their refinancing efficiency, for instance. These tools can be used in a coupled-lattice recursive analysis process to obtain the value of asset-backed securities such as mortgage-backed securities and collateralized mortgage obligations.

12 Claims, 6 Drawing Sheets

OTHER PUBLICATIONS

Levin, A., *Active-Passive Decomposition in Burnout Modeling*, The Journal of Fixed Income, Mar. 2001, pp. 27-40.

Kariya, T., et al., *Pricing Mortgage-Back Securities (MBS)—A Model Describing the Burnout Effect*, Asia-Pacific Financial Markets, vol. 7, 2000, pp. 189-204.

LaCour-Little, M., *The Evolving Role of Technology in Mortgage Finance*, Journal of Housing Research, vol. 11, Issue 2, 2000, pp. 173-205.

Fabozzi, F., *Fixed Income Securities*, $2^{nd}$ Edition, Published by John Wiley & Sons, Inc., 2002, pp. 1-464.

* cited by examiner

FIGURE 1

FIGURE 3 - Modeling Mortgage Pool Prepayment Behavior Using Refinancing Efficiency Figure 4
Coupled-Lattice Recursive Analysis Figure 5 Mortgage-MBS Coupled Lattice

METHOD OF AND APPARATUS FOR ADMINISTERING AN ASSET-BACKED SECURITY USING COUPLED LATTICE EFFICIENCY ANALYSIS

Priority is claimed to U.S. Provisional Application No. 60/334,961 filed in the United States on Dec. 4, 2001, herein incorporated by reference.

BACKGROUND OF THE INVENTION

1. Field of the Invention

The present invention relates to data processing of financial securities using automated electrical financial analysis, and more particularly to a method of administering an asset-backed security (ABS) such as a mortgage-backed security (MBS) or a collateralized mortgage obligation (CMO).

2. Description of Related Art

A mortgage-backed security (MBS) is a type of an asset-backed security (ABS), which is derived from a pool of mortgages. Specifically, a collection of mortgages are gathered to form a pool, usually according to common, pre-selected characteristics such as interest rate and amortization as well as other characteristics. The pool of mortgages generate cashflows through the payments of principal and interest by the mortgagors. A specified portion of these cashflows is passed to the holder of the mortgage-backed security.

One type of a mortgage-backed security is the mortgage passthrough security. Typically, a holder of such a security receives all of the principal cashflows and part of the interest cashflows. The interest cashflows received by the MBS holder is based upon a fixed interest rate applied to the outstanding principal. For instance, a mortgage-backed security based on a pool of conforming residential mortgages, typically pays a coupon that is 0.5% below the weighted average coupon of the mortgages. The difference is retained by the issuer for servicing costs, default risk, and profit.

Additionally, mortgage-backed securities can be created by decomposing the cashflows generated by a pool of mortgages into tranches, called collateralized mortgage obligations (CMOs). The principal payments typically flow through to the tranches on a pro-rata or sequential basis. Each tranche has its own fixed or floating interest rate. An important example is a principal only (PO) strip, which passes through only principal payments and no interest payments.

The cashflows generated from these mortgages are susceptible to change due to prepayments made by the mortgagors. These changes affect the value of the MBS and the possibility of their occurrence is called prepayment risk. Prepayment modeling is the dominant consideration of MBS valuation. Projections of future prepayments are typically derived from historical data.

Prepayment risk has different causes. For instance, the mortgagor may sell the mortgaged house to move to a different location. If the mortgagors default on their obligations, the remaining principal is paid by the issuer of the mortgage-backed securities to the holders, resulting in prepayment. Additionally, certain mortgagors will make extra principal payments on a monthly basis to reduce future payments.

Further still, some mortgagors will refinance mortgages for purely economic reasons, for instance, when refinancing rates are lower than the rate on the outstanding mortgage. Unlike other types of prepayments, refinancing prepayments are primarily driven by interest rates, which behave unpredictably.

Hence, it can be seen that prepayment is a dominant factor in the valuation of mortgage-backed securities. Valuation is essential for portfolio management and the structuring and trading of the mortgage-backed securities. The prepayments depend on interest rates (which drive refinancings), demographics (which affect home sales and foreclosure), and real estate values (which affect refinancings for converting equity into cash), home sales, and foreclosures.

To assist in accounting for prepayments in the valuation of mortgage-backed securities, historical prepayment data is available and often used. Major industry players even use loan-level, obligor-specific data to refine prepayment models. The expected prepayment behavior is estimated statistically from historical data. There are complications, however, such as "burnout" where there is a slow-down of prepayments following an active period of refinancings. The burnout is typically modeled by adjusting the input parameters of a model according to historical burnout patterns.

Figure 1:
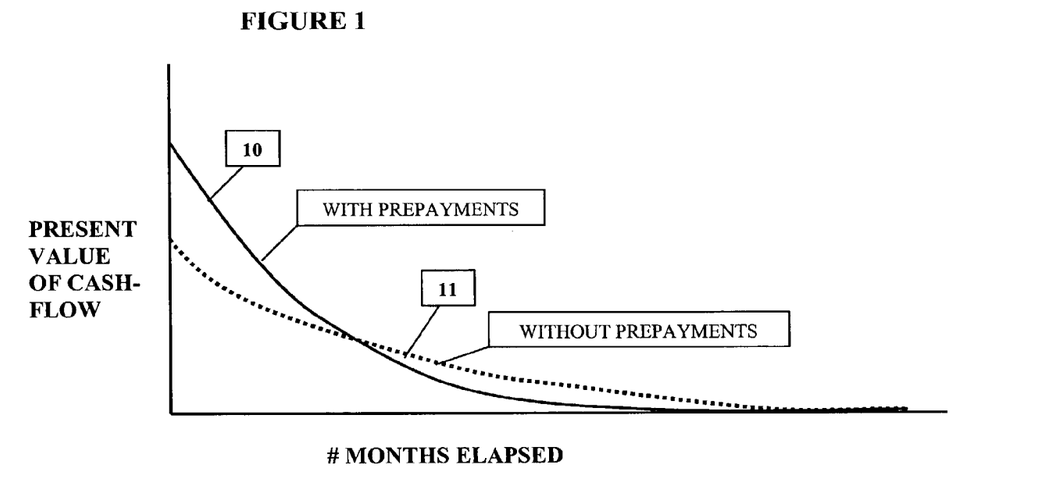
FIG. 1 is a graph showing the present value of future cash for mortgage-backed securities illustrating the difference between mortgage-backed securities having no prepayment option, and mortgage-backed securities with a prepayment option.

An example of the effect of prepayment on the present value of a mortgage-backed security is graphically illustrated in FIG. 1. Because the prepayments result in payment of principal, the present value of the MBS in the presence of prepayments 10 is initially higher than the present value 11 if there were no possibility of prepayments. However, over time the present value will drop below the level that would otherwise be expected if prepayments were not a factor.

Since the introduction of mortgage-backed securities over two decades ago, the market has seen an enormous volume of research pertaining to the prepayment behavior of residential mortgages, with the aim of improving the pricing of mortgage-backed securities and associated derivative structures.

Most of this research consists of statistical analysis of historical pool-level prepayment data. The recent trend has been to refine this approach by incorporating loan-level information. But in spite of the considerable effort, the predictive power of prepayment models has been rather disappointing.

Although the right to prepay is generally recognized as a formal option imposed by applicable law, option-based modeling is virtually absent in MBS analysis. Prepayment formulas driving MBS valuation engines depend on the yield curve, but not on the volatility that gives rise to the curve.

An exception was an effort at Merrill Lynch circa 1987 and 1988, described in Andrew Davidson, *The Refinancing Threshold Pricing Model: An Economic Approach to Valuing MBS*, Journal of Real Estate Finance and Economics, June 1988. This model attributed variations in prepayments to variations in transaction costs, grouped mortgagors by transaction cost, and determined optimal refinancings based on transaction costs. While the approach was a step in the right direction, it did not model mortgage prepayments sufficiently rigorously. In particular, the model did not distinguish refinancings from other types of prepayments, nor did it consider an optionless mortgage yield curve, distinct and separate from the MBS curve. In addition, since transaction costs were assumed to be positive, this approach does not allow for the existence of leapers (described below). Evidently the approach gained limited acceptance and was eventually abandoned.

In general, the values of mortgage-backed securities have typically been determined by Monte Carlo simulation. Monte Carlo simulation is used extensively in finance for such tasks as pricing derivatives or estimating the 'value at risk' of portfolios.

The valuation of the mortgage-backed security by Monte Carlo simulation involves generating hundreds, if not thousands, of interest rate scenarios, calculating the cashflows generated by the mortgage pool under each scenario, and thereafter calculating the cashflow passed through to the mortgage-backed security for each scenario. The cashflows are then valued using the scenario-dependent interest rates. The mortgage-backed security value is the average of the scenario-dependent values.

Monte Carlo simulation is computationally intensive. It is particularly difficult to obtain accurate estimates of risk using Monte Carlo simulation. The conventional mechanism for valuing mortgage-backed securities is less than ideal for at least this reason.

SUMMARY OF THE INVENTION

An object of the present invention is to estimate a fair price and interest rate sensitivity of an asset-backed security such as a mortgage passthrough securities and collateralized mortgage obligations.

Determining the fair price of an asset-backed security is required for portfolio management and trading. Determining the interest rate sensitivity is needed for portfolio management and risk management. The conventional mortgage-backed security analysis focuses on historical prepayment behavior rather than market prices. It cannot reliably explain market prices. Also, the conventional valuation of mortgage-backed securities is by the Monte Carlo analysis. The Monte Carlo analysis is both imprecise and often slow due to the computationally intensive nature thereof.

The present inventors introduce a new approach to valuing mortgage-backed securities. Core or baseline prepayments that do not depend on interest rates are modeled using a vector of prepayment speeds, while refinancings are modeled using an option-based approach. A full spectrum of refinancing behavior is described using the notion of refinancing efficiency. There are financial engineers who refinance at just the right time, leapers who refinance too early, and laggards who wait too long to achieve optimum refinancing efficiency.

The initial mortgage pool is partitioned into "efficiency buckets", whose sizes are calibrated to market prices. The composition of the seasoned pool is then determined by the amount of excess refinancings over baseline prepayments. Leapers are eliminated first, then financial engineers, and finally laggards. As the pool ages, its composition gradually shifts towards laggards, and this automatically accounts for burnout.

A distinguishing feature of the present invention is the rigorous analysis of mortgages. It requires an optionless mortgage yield curve that may not be explicitly observable (because all common mortgages in the U.S. include this option) but is implied by market data. Mortgage rates and MBS rates are represented as two correlated lattices: one determines mortgage refinancings and the other values the MBS. This formulation allows for recursive valuation that is orders of magnitude faster than conventional Monte Carlo analysis, resulting in increased accuracy and superior performance.

More succinctly, the present inventors have developed a new approach to asset-backed security analysis, which is based on refinancing efficiency. In the inventors' approach the obligors are assumed to refinance at different levels of efficiency. The refinancing efficiency is an option-based measure, which is used by bond issuers in making refunding decisions.

The mortgage pool is divided into efficiency "buckets" or categories. The value of the cashflows generated by each bucket is analyzed by a lattice-based recursion method. The values of the buckets are combined to determine the value of the full asset-backed security.

If desired, the allocation of the asset pool to the efficiency buckets can be adjusted or calibrated so that the prices obtained by the model agree with actual market prices. This adjustment process in various contexts is commonly called calibration.

BRIEF DESCRIPTION OF THE DRAWING FIGURES

The present invention will now be explained by way of exemplary embodiments, to which it is not limited, as shown in the accompanying figures.

DETAILED DESCRIPTION

Introduction

To understand the importance of the present invention, one should consider how much the market charges, in form of a coupon increment, for the prepayment option on a 30-year mortgage. Although the optionless rate (e.g., the rate on a 30-year mortgage that could not be prepaid) is not directly observable, as stated above, it can be estimated by considering mortgages as private placements of the appropriate credit. Given the optionless rate, one can estimate the fair cost of the option. For example at a 15% interest rate volatility, the incremental cost of the option would be 75 to 125 bps (basis points), depending on the shape and level of the yield curve. But this estimate far exceeds the actual cost charged by the market, and it is easy to explain why.

The reason is that a large percentage of the mortgages will prepay prior to maturity due to factors that have nothing to do with low interest rates. The market recognizes that the pool's average life under the baseline prepayments is much shorter than the contractual average life, and this is manifested in a lower coupon premium. Current prepayment models tend to intermingle baseline prepayments with interest rate driven refinancings. In options terminology, they fail to specify the underlying structure against which the option is exercised.

The first critical step in an analysis using the present invention is a realistic estimate for the speed of baseline prepayments; any excess over the baseline is attributed to refinancings. The second is an options-based model of refinancing behavior of individual mortgagors. The model is calibrated by fitting it to observed prices of mortgage pools using a distribution of buckets corresponding to various mortgagor behaviors. The formulation allows for recursive valuation and thus eliminates the need for Monte Carlo simulation.

To describe the present invention herein, the emphasis will be on the analytical approach, rather than the numerical results. The present invention provides a powerful tool-kit that gives the user full control for modeling prepayments.

The refinancing option embedded in an MBS is an example of what is called herein an induced option.

The inventive valuation framework distinguishes between the option holder (e.g., the mortgagor) and the investor whose value is affected by the option exercise (mortgage or MBS). This is an instance of what is called an induced option.

A financial instrument is said to have an induced option, if its cashflows depend on the exercise of an option associated with some related instrument, whose value is determined by a different market (and therefore a different process) than the original instrument. Here, the MBS has an induced option, because its cashflows depend on when mortgagors in the underlying pool exercise their refinancing options.

Since the financial interests of the refinancing option holders (the mortgagors) and the MBS investors are not equal and opposite, it follows that even if all mortgagors were FE's, the options will not be exercised at the greatest expense to the investors. In fact, it is even possible that the optimal time for exercising options leads to financial gain for both the mortgagors and the investors.

Induced options are not difficult to analyze, but exhibit striking behavior. First, as observed, it is possible that being short an induced option has positive financial value. Second, since the option is not being exercised optimally, the payoff function is discontinuous. This leads to interesting challenges in hedging, valuing, and measuring the risk of an induced option that is at-the-money or close to it.

II. The Infrastructure of the Residential Mortgage Market

Next a review of the salient features of the market for single-family residential mortgages is provided. There are sources that contain greater detail, including Frank J. Fabozzi, *Fixed Income Securities,* 2nd Edition, John Wiley & Sons, 2002.

A convenient starting point is the daily commitment rate posted by one of the relevant agencies, such as Freddie Mac, for 30-year mortgages. In essence, a postal daily commitment rate means that during the next month Freddie Mac will pay par for a "conforming" mortgage with the posted rate, say 6.50%. In order to conform, the mortgage must be insured and follow standard amortization schedule. Technically the posted rate defines a put option for the day.

Now consider the perspective of the mortgage originator, such as a bank or an S&L. In order to deliver a 6.50% mortgage to Freddie Mac at par, the originator needs to charge the homeowner substantially more than 6.50%. First, independent of its ultimate owner, a mortgage must be serviced. Second, in order to conform to Freddie Mac's requirement, the mortgage must be insured.

The estimated annual cost of servicing varies between 15 and 35 basis points. Whether the originator keeps or subcontracts servicing, the cost is an on-going cost. A working assumption is that the cost of servicing reduces the effective coupon received by the originator by 20 bps, with a commensurate reduction in fair value. This, as well as every other assumption below, can be easily changed in the model provided by the present invention. The estimated annual insurance cost ("guarantee fee") is between 10 and 15 basis points, depending on the negotiating power of the originator over the insurer (who is often the same agency that buys the mortgage). Evidently, larger and more powerful banks can negotiate more favorable terms than smaller ones.

The above indicates that in order to deliver a conforming mortgage, the originator must charge at least 35 basis points more than Freddie Mac's posted rate, disregarding administrative expenses and a margin for profit. In addition, there is a risk that mortgage sold to the agency will not be consummated (particularly during periods of declining interest rates), in which case the originator may have to cover its short sale at a loss. Hedging this possibility entails additional cost. The originator usually recovers these expenses by charging upfront fees, perhaps in excess of 1% of the size of the mortgage.

Finally, returning to Freddie Mac, who purchases the individual mortgages at the posted rate, then combines these mortgages into a pool, structures an MBS against the pool, and sells the MBS to the public. The coupon of the MBS is determined by Freddie Mac. For example, if the pool consists of mortgages that were purchased with a net 6.47% coupon, Freddie Mac could issue either 6½% MBS at a premium or 6% MBS at a discount. In the latter case, Freddie Mac would retain the 47 bps difference. Investors normally prefer to purchase new MBS at a discount. The guarantee fees and the float (between the times when it receives the mortgage payments and when it pays the MBS investor) are additional sources of profit for Freddie Mac.

Figure 2:
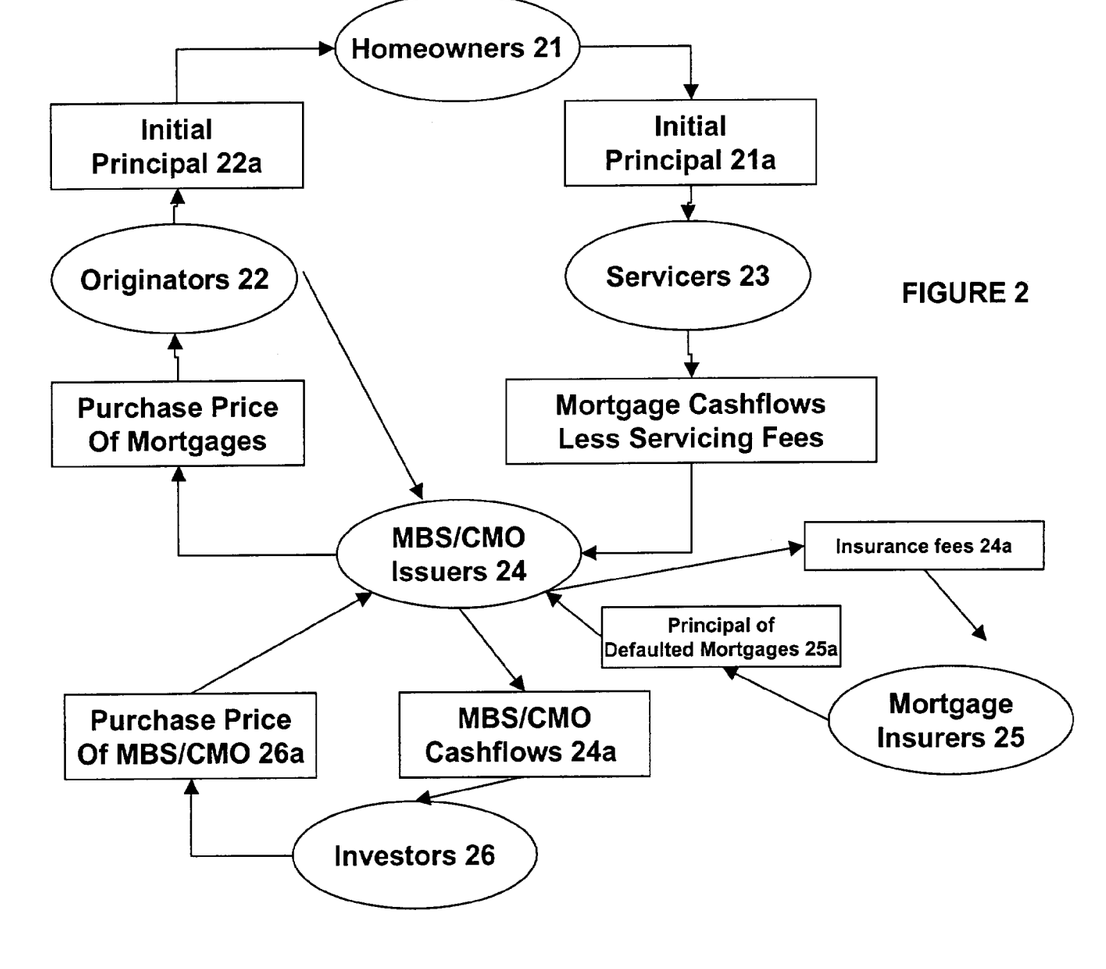
FIG. 2 is a flow chart illustrating the management of mortgages and mortgage-backed securities.

FIG. 2 illustrates is a simplified flow diagram of portfolio management activity. For instance, mortgage originators 22 issue mortgages and initial principal 22a to homeowners, pool the mortgages, and sell them to an MBS/CMO issuer 24. The issuers 24 securitize the pools, creating MBS passthrough and CMO securities. The cashflows of these securities are insured by a mortgage insurer 25, which collect insurance fees 24a and pay the principal of defaulted mortgages 25a when necessary. Investors 26 purchase (26a) the MBS and CMO securities and receive the cashflows 24a associated with these securities. Mortgage servicers 23 are responsible collecting the mortgage payments including the initial principal 21 a from the homeowners 21 and passing them to the MBS/CMO issuers 24 and for ultimate distribution to the investors 26. Accurate and robust valuation of pools of mortgages and MBS and CMO securities is essential to the asset-liability and risk management activities of the originators 22, servicers 23, MBS/CMO issuers 24, mortgage insurers 25, and investors 26.

To summarize, major differences between a mortgage and an MBS, from the perspective of the investor, include:

Cash flow: The owner of a mortgage is responsible for servicing; the owner of an MBS has no such expense and thus receives the stated coupon. In the examples herein, an adjustment is made for the cost of servicing by deducting 0.2% from the stated coupon of the mortgage. Furthermore, the MBS flows lag the mortgage flows, by, e.g. 14 days;

Credit risk: while a mortgage is collateralized by the underlying property, conforming mortgages constituting an MBS are actually insured against default; and Liquidity: an MBS, being a market-traded security, is considerably more liquid than a mortgage.

Insurance and liquidity obviously make an MBS a more desirable investment vehicle than a pool of mortgages. Herein, this is quantified in terms of the difference of the respective OAS's.

Prepayment Model According to the Present Invention

Under the present invention a distinction is made between interest-rate driven refinancings and all other prepayments. It is assumed that the sole purpose of refinancings is to reduce interest expense. Using the term more broadly than customary, all other prepayments are referred to as turnover.

The dominant contributor to turnover is the sale of property. Other reasons include partial prepayment of principal (also known as curtailment) and increasing the size of the mortgage to realize appreciation of the property (known as cashout). This distinction between turn over and refinance can be imperfect because some home sales may in fact depend on interest rates, but the inventive approach is adequate for modeling purposes.

Turnover

Turnover is described by a vector of monthly speeds over the 30-year contractual life of the mortgages. In the examples below, it is assumed that this vector is percentage of the industry-standard Public Securities Association (PSA) prepayment vector. According to the PSA prepayment vector, after the initial two years 6% of the outstanding mortgages prepay per year. So if the turnover rate is 50% of the PSA, 3% of the mortgages prepay annually, excluding refinancings.

Expert estimates of turnover vary between 75% and a 100% of the PSA. Data from periods of high interest rates and therefore low rates of economical refinancing support this opinion. Based on historical experience, a turnover rate of 50% of PSA is too low and 150% of PSA is too high.

The present inventive model can be used to determine the market-implied turnover rate. Its results are consistent with expert opinion and historical experience, e.g. it finds that 50% of PSA is too low, and 150% is too high. The range from 75% to 100% seems reasonable, and our subsequent examples herein will assume 75% of PSA. This is the "baseline" rate.

The method in accordance with the present invention of estimating the baseline rate will be based on the following observations:

The coupon rate of a new mortgage incorporates the market's expectation of prepayments (turnover combined with refinancings);

While turnover is a source of uncertainty, it is not necessarily detrimental to investors;

In contrast to turnover, benefits to homeowners from refinancing are strictly at the expense of the investors;

So most of the coupon premium for the prepayment option should be attributed to refinancing risk, rather than turnover risk; and Turnover reduces the average life of mortgages, and thus the refinancing risk. The higher the expected turnover the less the market charges for the refinancing option.

Refinancing Behavior

The risks entailed in the refinancing decision are obvious: ex post refinancing will be seen as premature if rates continue to decline, while waiting is a mistake if rates turn upwards. There are, however, accepted option-based valuation tools available for deciding when to refinance; corporations and municipalities routinely employ a method described below in their bond refunding decisions. William M. Boyce and Andrew J. Kalotay, *Optimum Bond Calling and Refunding, Interfaces,* November 1979, C. D. Howard and Andrew J. Kalotay, *Embedded Call Options and Refunding Efficiency, Advances in Futures and Options Research,* Vol. 3, 1988. For a review of the underlying theory, see Andrew J. Kalotay, George O. Williams and Frank J. Fabozzi, *A Model for Valuing Bonds and Embedded Option " Financial Analysts Journal,* May/June 1993.

The basic idea to treat the right to refinance as a formal call option, exercisable at any time at par. Given the prevailing mortgage rates and a market-based interest rate volatility, a mortgagor can determine the value of the refinancing option and compare it to the savings attained from refinancing (expressed in present value terms). The ratio of savings to option value is the so-called refinancing efficiency. Although the efficiency cannot exceed 100%, it can achieve it, if rates are sufficiently low (At that point the expected cost of waiting exceeds the cost of the new mortgage). The savings are calculated in present value terms using optionless discount rates. The option value is calculated assuming that the interest rates will follow a random walk. A random walk is one in which future steps or directions cannot be predicted on the basis of past events. The concept of refinancing efficiency is used by sophisticated bond issuers including federal agencies to determine when to call their bonds.

A financially sophisticated homeowner will act when refinance efficiency is reaches 100%. Admittedly, few homeowners possess the financial sophistication described above. Herein, those who do refinance at the optimal time are referred to as financial engineers (FE's). Most homeowners refinance too early (at an efficiency less than 100% of the option value) or too late (sometime after efficiency reached 100%). Herein people who refinance early will be referred to as leapers and to those who act late as laggards, as explained elsewhere. Financial engineers, leapers and laggards encompass the entire spectrum of refinancing behavior. While there are alternative ways of parameterizing this spectrum, the one proposed herein is a natural extension of the definition of the FE.

Under the present invention, refinancing behavior is characterized by assigning to each mortgagor an imputed coupon. A mortgagor will refinance whenever a FE would refinance a mortgage with the imputed coupon. For example, a 7% mortgagor whose imputed coupon is 7.5% (a "0.5% leaper") will refinance too early—at the time when a FE would refinance a 7.5% mortgage. Similarly, a 6% imputed coupon characterizes a 1% laggard.

Figure 3:
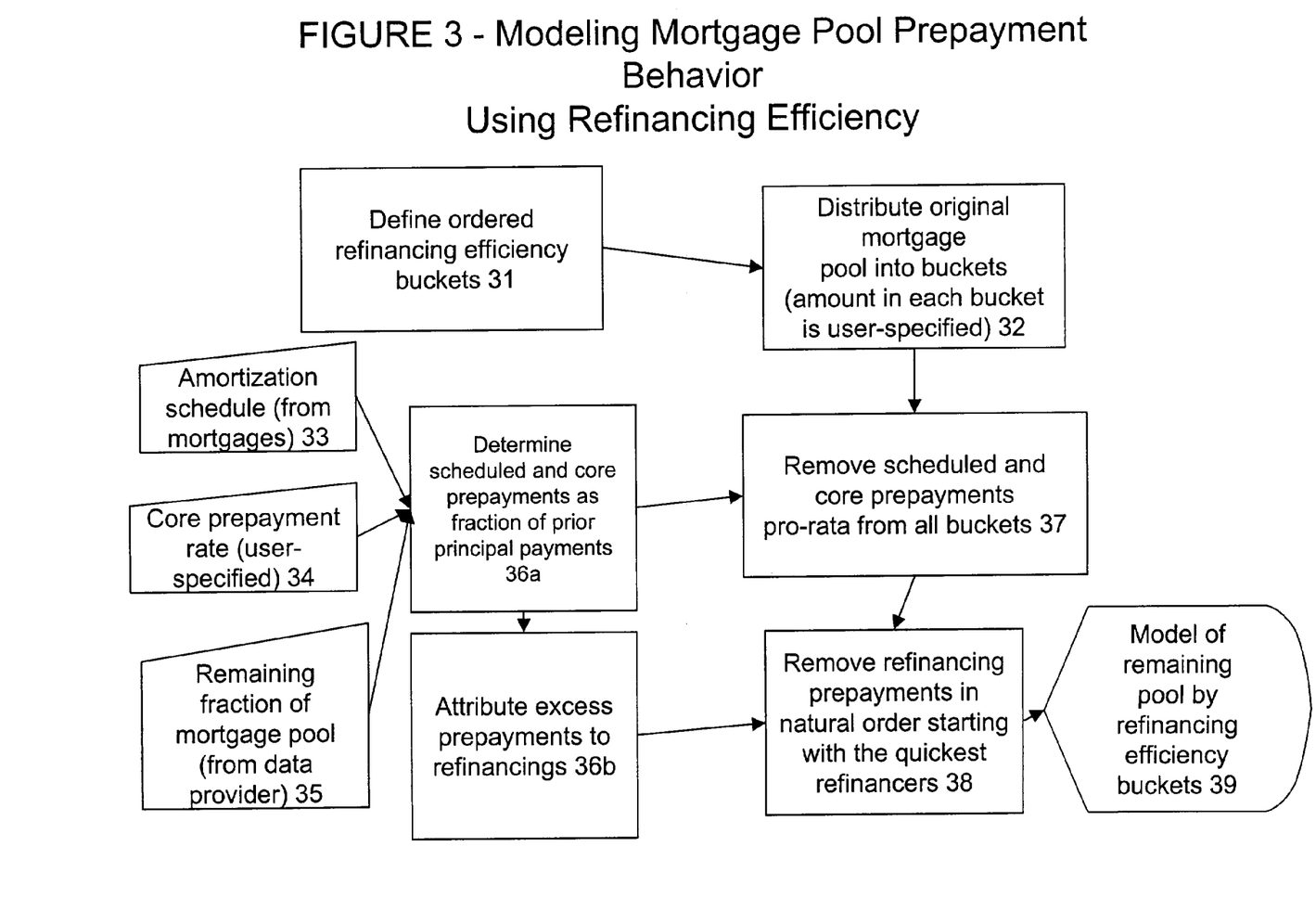
FIG. 3 is an illustration of modeling mortgage pool prepayment behavior using refinancing efficiency in accordance with the present invention.

It is reiterated that the present invention departs from prior methods of valuing an asset-backed security by categorizing the obligors into refinancing efficiency buckets, as shown at step 31 of FIG. 3. The obligor efficiency buckets are defined across three categories as explained above. To reiterate, a first category of buckets consists of leapers who refinance too early, i.e., below 100% refinancing efficiency. A second category consist of the financial engineers who refinance at the appropriate time, i.e., with 100% refinancing efficiency. A third category is made of are the laggards who wait too long.

The original assets in the asset pool are then partitioned into asset pool efficiency buckets as shown at step 32 of FIG. 3. In an exemplary embodiment, the amount in each bucket is user-specified. For instance, the user can input a value for each bucket, or use one of a plurality of data sets, which optionally can be further adjusted by the end user.

If the asset-backed security is being valued at some time after it was first issued, then there will have been prior principal payments. The remaining principal represents the initial principal minus the sum of all scheduled and unscheduled principal payments that have been made prior to the valuation date. The amortization schedule 33 specified by the terms of the assets (e.g., the actual mortgage terms), the rate of prior prepayments not due to refinancings or amortization (typically specified by the user of the valuation system) 34, also referred to as the core or base prepayment rate, and remaining principal 35 are used to estimate the amount of prior principal payments that are due to refinancings (steps 36a and 36b shown in FIG. 3).

Prior scheduled principal payments and prepayments not due to refinancings are removed from all asset pool efficiency categories on a pro-rata basis (step 37). Prior principal prepayments attributed to refinancings are then removed from the buckets, starting with those corresponding to the obligors who are most likely to refinance early, i.e., the leapers. If all of the leapers have been removed, the next to be removed are the financial engineers, followed by the laggards (step 38). The remaining buckets represent a model of the remaining pool (step 39).

Figure 4:
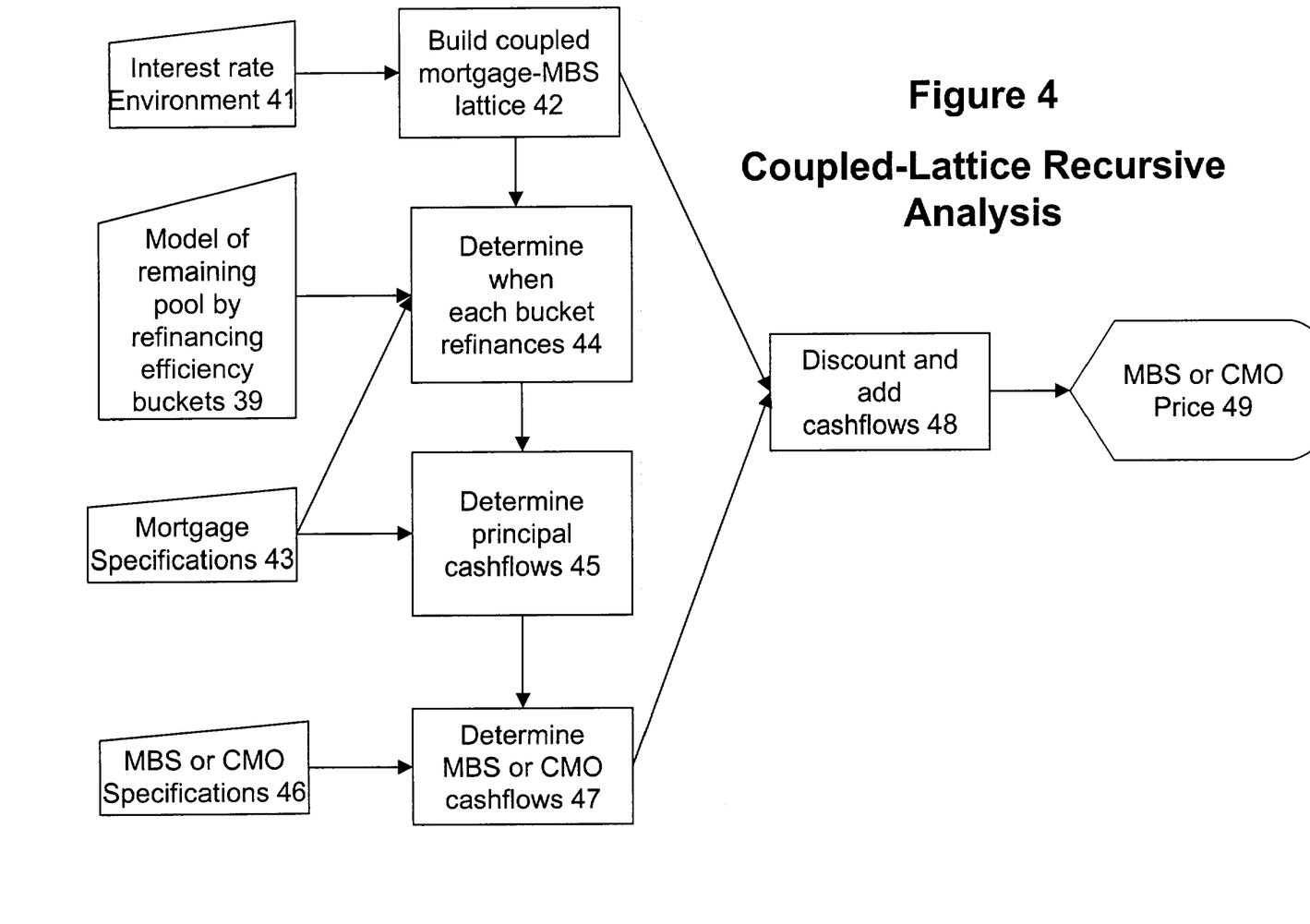
FIG. 4 is an illustration of how to use the mortgage pool model displayed in FIG. 3 and a coupled lattice to determine the value of an MBS or CMO, in accordance with the present invention.
Figure 5:
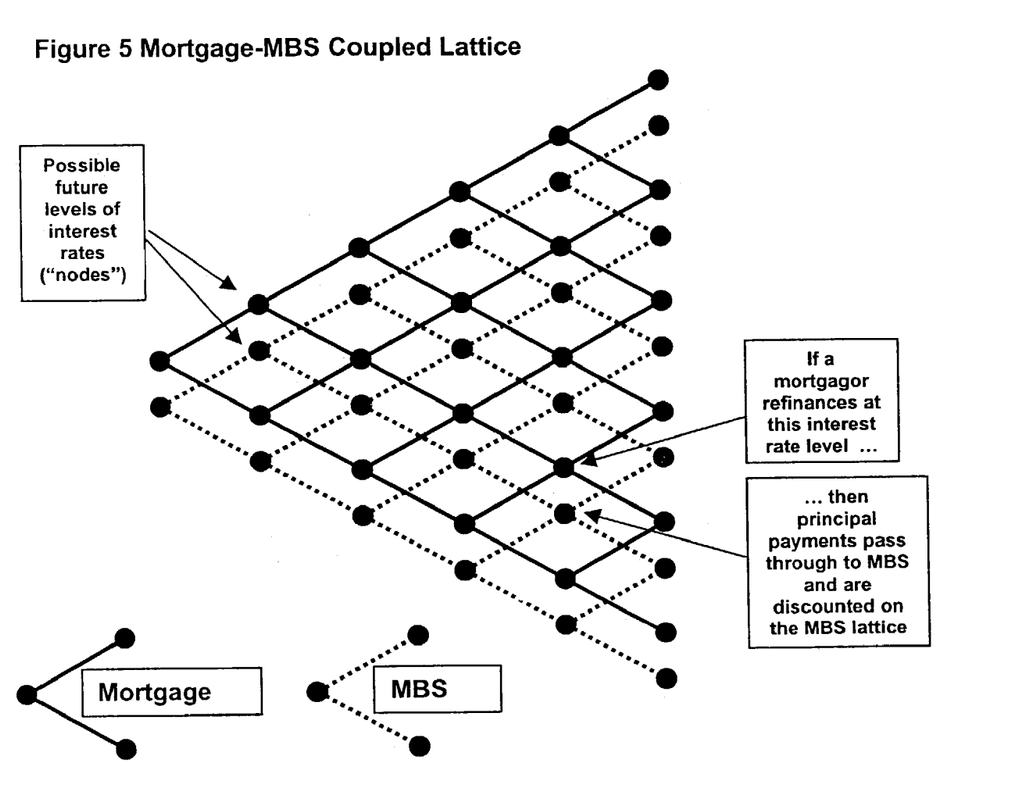
FIG. 5 is a graphical explanation of a mortgage-MBS coupled lattice.

The value of the portion of the asset-backed security corresponding to each bucket is modeled using a coupled-lattice-based analysis, such as illustrated in FIG. 4. In this instance, as illustrated in FIG. 4, the interest rate environment 41, i.e., the interest rates as well as their volatility are inputs to the process of building a coupled lattice, as illustrated in step 42. A coupled lattice consists of two term structure lattices, which are assumed to be correlated. One models the future movements of the interest rates relevant to the assets in the asset pool; the other models the discount rates used to value the cashflows of the asset-backed security. Both assume that interest rates follow a random walk. An exemplary diagram of a coupled Mortgage-MBS lattice is shown in FIG. 5.

One way to build the coupled lattice is to build a lattice that models a benchmark term structure and then obtain the coupled lattice by shifting the benchmark lattice by an option adjusted spread (OAS) for each term structure. The OAS is a measure of a security's extra return over the return of a comparable benchmark security after accounting for any options (calls, puts, sinking funds).

The construction of the coupled lattice requires estimating the fair non-refinanceable loan rates appropriate for the assets in the asset pool, from current market rates. For example, mortgages are required by federal law to be refinanceable, and therefore the mortgage rates quoted by issuers are always refinanceable rates.

After the coupled lattice is constructed, the next step is to determine for each bucket, the "nodes" in the lattice at which the obligors refinance their loans. At nodes where refinancing occurs, principal payments flow through from the asset pool to the asset-backed security. All the information about principal payments is then used to determine the cashflow generated by the asset-backed security at each node in the lattice. These future cashflows can then be valued using the standard lattice-based recursive valuation method. The expected value of all of the potential future cashflows is the value of the asset-backed security.

The model of remaining pool assets by refinancing efficiency buckets from step 39 in FIG. 3 and mortgage specifications 43 are used to determine when each bucket refinances (step 44). The mortgage specifications 43 and the determination as to when each bucket refinances (step 44) are used in determining principal cash flows (e.g., core and interest payment rate cash flows) for the asset pool at step 45. The asset-backed security specifications 46 and the determined principal cash flows from step 45 are used to determine future cash flows from payments paid by the asset pool at step 47 of FIG. 4. Using the lattice from step 42 and the determined cash flows from step 47, the cash flows are discounted and added at step 48. The result is an estimate of the asset-backed security price 49.

Related Assumptions

With respect to the particular examples offered herein, the following is a list some of related assumptions:

The turnover rate is uniform across all types of mortgagors, be they leapers, laggards, or FE's;

Migration over time across behavioral types is not allowed: once a laggard, always a laggard; and The refinancing decision of a FE is "myopic", i.e. it depends only on the contractual terms of the mortgage and not on the expected turnover of the pool.

However, the inventive model can be adjusted to accommodate the removal or replacement of these assumptions.

Burnout

Burnout refers to the observed slowdown of prepayments following periods of intensive refinancings. It is attributed to changing distribution of the pool: the most aggressive mortgagors are the first to refinance, leaving behind the slower reacting laggards.

Conventional MBS analysis handles burnout by changing the parameters of the prepayment function. One possible refinement is to partition the pool by prepayment speeds, so that the earliest prepayments will be attributed to the fastest sector. See, Alexander Levin, *Active-Passive Decomposition in Burnout Modeling, Journal of Fixed Income*, March 2001.

From the so-called "factor", defined as the ratio of the remaining principal to the original principal, the extent of prepayments can be inferred. Contractual amortization determines at any given time, the maximum possible value of the factor, assuming no prepayments at all. Any difference between this maximum and the actual value is due to prepayments. Although conventional prepayment models do not explicitly distinguish between turnover and refinancing ex post, the small factors of high-coupon pools are understood to be primarily due to refinancings.

Within the present invention, burnout requires no special treatment. The assumed turnover determines a baseline value of the factor. Any difference between the baseline and actual factors is attributed to refinancings. Because the order in which mortgagors refinance is specified (leapers first, followed by FE's, etc.), the factor unambiguously determines who is gone from and who still remains in the pool. In statistical terms, the factor determines the conditional distribution of leapers and laggards, given an initial distribution.

Therefore, burnout is a natural consequence of our model. Given two otherwise identical pools, the one with the smaller factor will automatically prepay more slowly.

A Closer Look at Leapers and Laggards

Implementation of the present invention involves user-specified turnover rate and leaper/laggard distribution. These can be estimated from market prices, but the estimates will obviously be correlated.

Under the present invention, the following procedure is recommended. First, assuming a simple and reasonable leaper/laggard distribution (namely the naive distribution described below), the implied turnover rate is estimated from the prices of a new mortgages and MBS's. Given the result, the leaper/laggard distribution is refined using seasoned MBS prices.

The distributional assumptions are relatively unimportant for new pools but critical for pools constituting seasoned MBS's. At inception, the pool consists mostly of mainstream mortgagors, i.e. moderate leapers and moderate laggards. Because extreme laggards initially represent only a small percentage of the pool, their effect on the value of a new MBS is negligible.

In the case of a seasoned pool the situation is fundamentally different. Because leapers are the first to be eliminated, the conditional distribution will be weighted towards laggards. Explaining the prices of many MBS's with different factors requires a properly calibrated distribution.

The Range of Leaper/Laggard Spreads

While at first blush one might want to consider a relatively wide range of spreads, the relevant range is usually fairly narrow.

Leaper spreads are normally much less than 1%. Consider a 7% mortgagor whose imputed coupon is 8%. An FE will refinance an 8% mortgage when rates are in the 7% range, and this implies that a 1% leaper would immediately refinance a 7% mortgage. This is clearly nonsensical. Prepayment of a 7% mortgage when rates are at 7% can be only due to turnover, and not refinancing.

Laggard spreads can be wider. A 3% laggard will refinance a 7% mortgage only when rates are below 4%. Given the readily available information about current mortgage rates (the so-called "media effect"), anyone who does not refinance a 7% mortgage when rates are at 4% is unlikely ever to refinance. Therefore, the laggard spread is normally capped at 3% (floor at −3%), except for a single bucket of "infinite laggards", representing mortgagors who will never refinance.

Valuation Framework

Valuation of mortgage pools and MBS's requires two basic ingredients: a cash flow generator and a discounting mechanism.

First of all, refinancing decisions should be analyzed from the perspective of the mortgagor, rather than the investor. Herein, refinancing behavior is modeled by reference to FE's. Inputs into the FE's decision require the mortgagor's optionless yield curve (considered in detail below), as well as transaction costs (assumed to be 1% of outstanding principal). Given these, the analysis becomes straightforward lattice-based valuation of callable amortizing bonds. Note that path-dependence, the curse of traditional mortgage analysis, does not arise. Given an interest rate scenario, prepayments are unambiguously determined by the assumed turnover and leaper/laggard distribution.

The combination of turnover and refinancings determine the principal flows to the investor. By applying the nominal interest rate to the outstanding principal (adjusting for servicing cost in the case of a mortgage, but not an MBS), the cash flows that investor receives can be computed.

With respect to the valuation of the cash flows, yield curves/discount rates are specified as an OAS relative to the swap curve. To value an asset, two OAS's are used: one that determines the mortgagors' refunding decisions and the other that discounts the resulting cash flows that the investor receives.

As discussed above, due to credit and liquidity considerations the OAS of an MBS is significantly lower than that of a mortgage. FIG. 5 graphically depicts the process of valuing an MBS.

Discounting of MBS

To quantify the difference between the OAS of mortgages and MBS's, the cost of insurance is roughly 15 basis points, and it is assumed that liquidity enhances the OAS of MBS's by 25 to 35 basis points in the particular examples to follow. This suggests that the OAS of MBS's should be 40 to 50 basis points lower than the OAS of mortgages.

There is another important consideration that affects the OAS of mortgage-backed assets, both MBS's and pools of individual loans. The market discount rate depends not only credit and liquidity considerations, but also reflects the uncertainty of prepayments, above and beyond interest rate risk. Because prepayment uncertainty is not diversifiable, the market extracts a cost for it in the form of an increased OAS. It is assumed herein that the effect of prepayment uncertainty is the same for MBS's and whole loans, in terms of incremental OAS.

In considering the effect of prepayment uncertainty on MBS, the issuing agency's yield curve is a convenient reference; it normally hovers around the swap curve. (On Dec. 1, 2002, the 10-year Agency spread was about 12 bps above the 10-year swap rate.) Although in terms of credit protection MBS's are senior to the agency's debentures, because of the prepayment risk the OAS of MBS's is normally higher than the OAS of debentures. In particular, if the debentures trade on the swap curve (OAS=0), one would expect the OAS of MBS's to be positive.

Estimation of Optionless Mortgage Rates

Consider again the proposed analytical approach to the refinancing decision. According to the present inventive formulation, mortgagor's imputed coupon determines when refinancing occurs, namely when a FE would refinance a mortgage with the imputed coupon rate. A rigorous way of determining when a financial engineer would refinance has not been determined. A practical problem is that the quoted mortgage rates are always "callable" rates: the mortgage can be repaid without penalty at any time.

Prepayment is a formal option and it has a quantifiable value. Valuation of the option requires a yield curve of optionless mortgage rates, but unfortunately quoted mortgage rates always include the prepayment option. Nevertheless one can estimate the spread between the quoted callable rates and the theoretical optionless rates.

The spread is market-determined and therefore it reflects the collective expectation of prepayment behavior. As discussed above, mortgagors are expected to prepay, due to turnover and refinancings. If the turnover rates were known and if all mortgagors acted as FE's, calculation of the fair spread would be straightforward. But because of the general uncertain prepayment behavior the market extracts a structural premium, in the form of a higher mortgage coupon.

Analysis of a New MBS

In the spirit of current industry practice, the OAS of mortgages and MBS is estimated against the swap curve benchmark. The key swap rates as of Dec. 1, 2001 are shown in Table 1 below. The volatility of short-term interest rates is set to 15%, in line with the volatility used for agency bonds. The leaper/laggard spreads are modeled by the naive distribution.

TABLE 1

| Swap Rates as of Dec. 3, 2001 | | | | |
| --- | --- | --- | --- | --- |
| Term (years) | 2 | 5 | 10 | 30 |
| Rate (%) | 3.32 | 4.74 | 5.45 | 5.96 |

The 30-year mortgage rate posted by Freddie Mac on Dec. 3, 2002 was 6.47%, and from this it was estimated that mortgages at the time were originated with 6⅞% or 7% coupons.

The minimum value of the 7% mortgage occurs at 0.25% leapers. It is easy to why the value is increased by extreme leapers, those who refinance when the option is barely in the money. The figure confirms that the upper range for leapers is 0.5%, as discussed earlier. It is also clear why laggards increase the value by not refinancing when they should. But it is less intuitive why moderate leapers decrease the value by refinancing when they should not.

The answer lies in the myopic refinancing decisions, as discussed earlier. Optimal non-myopic refinancings would take turnover into account, and therefore happen earlier than optimal myopic refinancings. Because moderate leapers resemble a non-myopic FE's, early refinancings are more detrimental than optimal ones.

The value of a 6⅞% mortgage, which is closer to par, is virtually independent of behavioral assumption. Laggardly behavior would be obviously detrimental for coupon mortgages. Of course, the same considerations apply to MBS: leapers reduce the value of a high-coupon MBS, while laggards reduce the value of POs.

One can search for combinations of turnover rate and OAS that yield a specified value, say 100.50. A mortgage OAS of 60 bps would be too narrow relative to the MBS OAS. On the other extreme, an OAS in excess of 100 bps would imply that the refinancing option costs only about 35 bps ((7.00−0.20)−(5.45%+1.00)). (This assumes that the 10-year swap rate is the correct reference point for 30-year mortgages.) In general, higher turnover rate or lower OAS increases the value.

Evidently a 50% PSA turnover results in values that are too low, and 125% yields values that are too high. Any choice between 75% and 100% of PSA is defensible, in conjunction with the appropriate OAS. The present exemplary base case will assume that the turnover rate is 75% of PSA and the mortgage OAS is 80 bps. This combination yields an estimated fair value of roughly 100.50% amount for the mortgage.

At an OAS of 80 bps, the fair coupon of a 30-year mortgage that could never be prepaid is 6.60%. Based on a turnover rate of 75% PSA, the fair coupon of a mortgage that could be prepaid but not refinanced is 6.40%. (The lower coupon is due to the upward-sloping yield curve). In the case of a mortgages that can be prepaid at any time, the fair coupon assuming no turnover is 7.25%, while at a turnover rate of 75% PSA it is about 6.85%.

Accordingly, one can estimate that the market coupon is about 25 bps higher than the optionless contractual rate (6.85%-6.60%), while the cost of the refinancing option is 45 basis points (6.85%-6.40%). But the actual rate is 40 bps lower than what it would be in the absence of turnover (7.25%-6.85%).

With respect to MBS'S, as discussed above, the rate posted as of Dec. 3, 2001 by Freddie Mac was 6.47, so it can be assumed that a new 6½% MBS would sell at a modest premium, and a 6% MBS would sell at a discount.

To summarize, herein it has been estimated the implied OAS and turnover of new conforming mortgages from current market rates. The estimates are obviously correlated; the higher the turnover the lower will be the OAS. The present inventors have found that the combination a reasonable combination is 75% PSA turnover and 80 bps OAS. Turnover at 100% PSA would be on the high end, while 50% PSA is too low.

The estimated cost of the refinancing option corresponding to the (75% PSA, 80 bps OAS) combination would be 55 bps. This is considerably lower than what the option would cost for a straight 30-year level pay amortizing bond. Evidently the market recognizes that, regardless of refinancing opportunities, the pool will prepay faster than contractually required.

Sensitivity of a New MBS to Various Parameters

Fixing turnover rate at 75% PSA and the OAS at 80 bps, numerical results are presented pertaining to three considerations that affect the value of MBS: interest rates, WAC, and the "factor".

Table 2 displays the corresponding duration estimates of shifts the values of 6% and 6.5% MBS's.

TABLE 2

Duration of New MBS's Derived from 7% Mortgages

| MBS Coupon | Rates Up 25 bps | Rates Down 25 bps | Average |
|---|---|---|---|
| 6.0% | 6.0 | 3.5 | 4.8 |
| 6.5% | 3.7 | 2.3 | 3.0 |

The mortgage coupons range from 6.75% to 7.25%. The present inventors observe that the price of the 6's, which sell at a modest premium, increases by a small amount, from 98.69 to 99.06. The value of the 5's, which sell at a greater discount, increases from 96.27% to 97.61%. Finally, the value of the 6½'s, which are at a premium, declines from 101.11 to 100.50. The directions of these results are as expected. For example, because higher-coupon mortgages are refinanced earlier, decreasing the WAC increases the value of premium MBS'S.

CONCLUSION

The approach taken in the present invention to valuing mortgage-backed securities is parsimonious, easily implementable, and fast. The model realistically describes the behavior of MBS prices under any specified interest rate scenario and prepayment behavior. It is a powerful tool that can assist investors, traders, and risk managers.

Refinancing efficiency is defined as the savings that would result from refinancing divided by the option value. Because the savings from exercising the option cannot exceed its value, the maximum refinancing efficiency is 100%.

FIGS. 3 and 4 illustrates the overall process of the present invention. A method of administering an asset-backed security, comprising the steps of gathering specifications of aspects of a plurality of assets, wherein the assets generate cashflows from payment by obligors of principal and interest, and wherein a level of cashflows from the assets is susceptible to change due to prepayments by said obligors. The method then forms an asset pool from the plurality of assets according to at least one common aspect of the pooled assets, and derives an asset-backed security from the asset pool. The method then distributes cashflows based on at least one of principal payments and interest payments from the obligors whose assets are members of the asset pool.

The inventive method models asset pool prepayment behavior 185 including the sub-steps of: defining refinancing efficiency categories of obligors into at least three buckets according to an expected efficiency of obligors in deciding when to refinance. The method also partitions the assets in the asset pool into asset pool efficiency buckets according to the refinancing efficiency buckets. The method removes scheduled payments and core prepayments of principal, which are not related to changing interest rates pro-rata from all asset pool efficiency buckets. The method attributes excess of actual over scheduled prepayments to obligors refinancing assets in the asset pool; and removes assets from the asset pool in a preset order according to the defined ordered refinancing buckets of obligors to reflect refinancing of assets by obligors and thus obtain a model of remaining pool.

In the inventive method, a current value of the asset-backed security is determined using the following steps of: determining a core payment rate cash flow for the asset pool, generating a coupled asset-backed security/asset lattice from input interest rate environment, determining nodes on the lattice when each defined refinancing category of the asset pool would refinance using the coupled asset-backed security/asset lattice, determining future cash flow 186*d* from principal payments paid by asset pool using the model of remaining pool, determining asset-backed security cashflow including both principal and interest payments, and determining a value for the asset-backed security by discounting and adding cash flows.

Figure 6:
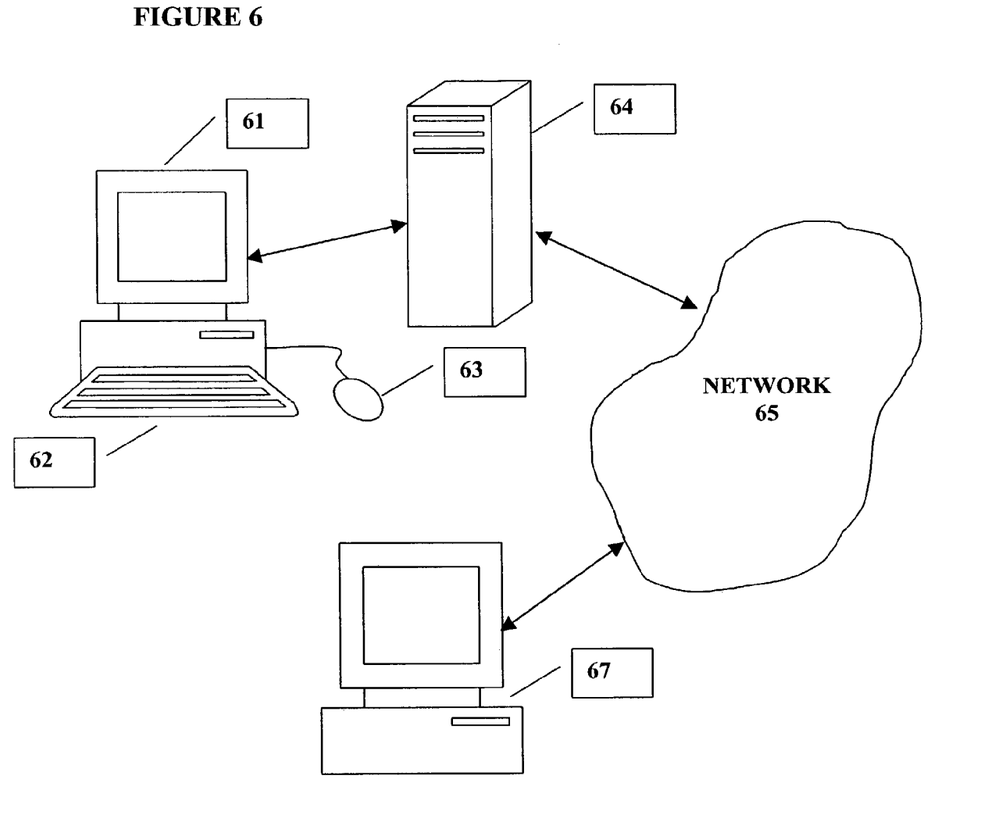
FIG. 6 shows an apparatus according to the present invention.

The present invention can be implemented in a general or specific purpose computer, or over a distributed network, either public or private as illustrated in FIG. 6. In FIG. 6, a computer 61, such as a personal computer, main frame or any other computer capable of carrying out the present invention is connected to input devices such as a keyboard 62, mouse 63, IR ports, etc. The computer 61 can optionally connected to a server 61 or have a server function that is accessible from a network 65 either private of public, e.g., the Internet, connected to other users 67. In this manner, users can access the values given by the inventive method as implemented in the forma of a computer program, which can be written through routine programming techniques. Users 67 input date and parameters for the method, via the Internet for instance. This numbers and other data are used in the inventive method to generate information, such as the value of the ABS, for transmission back over the network 65. The present invention can also be embodied as a computer readable media, such as but not limited to magnetic, optical or other type of storage device (regardless of whether it it's a RAM or ROM type), as well as transmissions of signals and data over public and private networks, etc. Once loaded on a user's computer or a computer accessible to the user, the method as described herein is usable, at least in part, by the user.

The present invention has been described by way of exemplary embodiments to which it is not limited. For instance, the specific examples have dealt with mortgage-backed securities or collateralized mortgage obligations. However, other interest rate sensitive obligations that can be refinanced would benefit from the present invention. The present invention is defined in the claims appended hereto and equivalents thereof.

What is claimed is:

1. A method for estimating the fair market value of an asset-backed security, said method being implemented in a computer having a processor and a computer-readable medium that stores program instructions, and comprising the steps of:
   a. retrieving specifications of aspects of a plurality of assets, said assets generating cashflows from payment by obligors of principal and interest, wherein a level of the cashflows generated from said assets changes due to prepayments by said obligors;
   b. retrieving a specification of the asset-backed security created from said plurality of assets;
   c. determining, by execution of the program instructions in the processor, from said specifications of said aspects of the plurality of assets and said specification of said asset-backed security, a schedule of future cashflows that will be generated from the assets based on at least one of principal payments and interest payments from said obligors whose assets are members of said asset pool;
   d. modeling, by execution of the program instructions in the processor, future prepayment behavior of said assets by said obligors, said modeling step including the sub-steps of:
      i. defining at least three refinancing efficiency categories of obligors according to an expected propensity of the obligors to refinance the assets,
      ii. partitioning the assets into asset pool efficiency buckets according to said refinancing efficiency categories,
      iii. removing scheduled payments and core prepayments of principal which are not related to changing interest rates pro-rata from all asset pool efficiency buckets,
      iv. attributing any excess of actual over scheduled prepayments to obligors refinancing assets in said asset pool, and
      v. removing assets from said asset pool in a preset order according to the defined refinancing efficiency categories of obligors to reflect refinancing of assets by obligors and thus obtain a model of the remaining pool; and
   e. determining, by execution of the program instructions in the processor, the current value of the asset-backed security, said current value determining step including the sub-steps of:
      i. determining a core payment rate cash flow for said asset pool,
      ii. generating a dual-coupled interest rate lattice from an interest rate environment information, including interest rates and respective interest rate volatilities, said lattice including a plurality of nodes representing points in time,
      iii. determining, for the plurality of nodes in the lattice, whether each defined refinancing category of said asset pool would refinance based on the interest rate environment information,
      iv. determining, for the plurality of nodes in the in the lattice, a respective first plurality of net cash flows for the asset-backed security, the first plurality of net cash flows including principal payments remaining in the asset pool after removal of assets prepaid due to refinancing,
      v. determining, for the plurality of nodes in the in the lattice, a respective second plurality of net cash flows for the asset-backed security, the second plurality of cash flows including both principal and interest payments, and
      vi. determining a value for said asset-backed security by discounting and adding the first and second plurality of net cash flows determined for the plurality of nodes in the lattice.

2. The computer-implemented method recited in claim 1, wherein said asset-backed securities are mortgage-backed securities and said obligors are mortgagors.

3. The computer-implemented method recited in claim 1, wherein said asset-backed securities are collateralized mortgage obligations and said obligors are mortgagors.

4. The computer-implemented method recited in claim 1, wherein said refinancing buckets of obligors include leapers who refinance before an optimal time, financial engineers who refinance at the optimal time, and laggards who refinance after the optimal time.

5. The computer-implemented method of claim 1, wherein said refinancing efficiency of obligors in deciding when to refinance is determined by a savings/option value, said saving/option value being calculated assuming that interest rates for similar assets will follow a random walk.

6. The computer-implemented method recited in claim 1, wherein the method sub-step of generating a dual coupled interest rate lattice from input interest rate environment includes the steps of:
   i. modeling interest rates assuming correlated asset and asset-backed security yield curves which follow a random walk; and
   ii. using said correlated asset and asset-backed security yield curves to construct said coupled asset-backed security/asset lattice.

7. The computer-implemented method recited in claim 1, further comprising:
   (f) using said value for said asset-backed security in one or more activities selected from a group consisting of a portfolio of whole loans, managing a portfolio of mortgage service rights, and formulating portfolio strategies.

8. An apparatus for administering an asset-backed security, comprising:
   a. a means for retrieving specifications of aspects of a plurality of assets, said assets generating cashflows from payment by obligors of principal and interest, wherein a level of the cashflows generated from said assets changes due to prepayments by said obligors;
   b. a means for retrieving a specification of the asset-backed security created from said plurality of assets;
   c. a means for determining, from said specifications of said aspects of the plurality of assets and said specification of said asset-backed security, a schedule of future cashflows that will be generated from the assets based on at least one of principal payments and interest payments from said obligors whose assets are members of said asset pool;

d. a means for modeling future prepayment behavior of said assets by said obligors, said modeling including the sub-steps of:
   i. defining at least three refinancing efficiency categories of obligors according to an expected propensity of the obligors to refinance the assets,
   ii. partitioning the assets in the asset pool into asset pool efficiency buckets according to said refinancing efficiency buckets,
   iii. removing scheduled payments and core prepayments of principal which are not related to changing interest rates pro-rata from all asset pool efficiency buckets,
   iv. attributing any excess of actual over scheduled prepayments to obligors refinancing assets in said asset pool, and
   v. removing assets from said asset pool in a preset order according to the defined refinancing efficiency categories of obligors to reflect refinancing of assets by obligors and thus obtain a model of the remaining pool; and
e. a means for determining the current value of the asset-backed security, said current value determining step including the sub-steps of:
   determining a core payment rate cash flow for said asset pool,
   ii. generating a dual coupled interest rate lattice from an interest rate environment information including interest rates and respective interest rate volatilities, said lattice including a plurality of nodes representing points in time,
   iii. determining, for the plurality of nodes in the in the lattice whether each defined refinancing category of said asset pool would reference based on the interest rate environment information,
   iv. determining, for the plurality of nodes in the in the lattice, a respective first plurality of net cash flows for the asset-backed security, wherein the first plurality of net cash flows includes principal payments remaining in the asset pool after removal of assets due to refinancing,
   v. determining, for the plurality of nodes in the in the lattice, a respective second plurality of net cash flows for the asset-backed security, the second plurality of net cash flows including both principal and interest payments, and
   vi. determining a value for said asset-backed security by discounting and adding the first and second plurality of net cash flows determined for the plurality of nodes in the lattice.

9. The apparatus of claim 8, wherein said asset-backed securities are mortgage-backed securities and said obligors are mortgagors.

10. The apparatus of claim 8, wherein said asset-backed securities are collateralized mortgage obligations and said obligors are mortgagors.

11. The apparatus of claim 8, wherein said refinancing buckets of obligors include leapers who reference before an optimal time, financial engineers who reference at the optimal time, and laggards who reference after the optimal time.

12. The apparatus of claim 8, wherein said refinancing efficiency of obligors in deciding when to reference is determined by a savings/option value, said saving/option value being calculated assuming that interest rates for similar assets will follow a random walk.

* * * * *